May 1, 1928.

C. W. GRAHAM 1,667,888

METHOD OF PRODUCING AND ARTICLE OF MANUFACTURE

Filed Sept. 22, 1922

Inventor.
C. W. Graham

Attorney

Patented May 1, 1928.

1,667,888

UNITED STATES PATENT OFFICE.

CHARLES W. GRAHAM, OF SAN FRANCISCO, CALIFORNIA, ASSIGNOR TO AMERICAN CAN COMPANY, OF SAN FRANCISCO, CALIFORNIA, A CORPORATION OF NEW JERSEY.

METHOD OF PRODUCING AND ARTICLE OF MANUFACTURE.

Application filed September 22, 1922. Serial No. 589,772.

The hereinafter described invention relates to the production of a metallic container and the container itself for the sealing of products generally, although more particularly designed for the hermetic sealing of food products and the class of containers more especially designed for the production thereof under the present invention being metallic cans. The object of the invention is the production of a closed ended container without the employment of solder for the union of the end thereto and equally so without the employment of what is commonly termed a "gasket lining" interposed between the flange member of a can end and the terminal end wall portion of the body of the said container, whereby the closed container is produced at a less expense and in a more efficient manner than heretofore. In brief, the invention is designed to take the place of the methods generally followed in the uniting of an end cover to a metallic body and which methods in use at the present time comprise either the soldering of the end cover to the can body or the uniting of the same thereto through the medium of double seaming the flange of the end cover wall to the terminal wall portion of the metallic container body.

The method invention forming the subject matter of the present invention has for its principal object the production of a container, the end cover of which is applied and hermetically sealed thereto by means of electric welding, whereby is eliminated the disadvantages and objections existing to the former methods of uniting the end cover to the body of the container and permits of the entire operation being performed and carried out through the use or medium of mechanism of extreme simplicity.

In the carrying out of my method invention, the end or cover plate to be applied to the container body is provided with an outwardly projected flange which is adapted to be brought into contact with the terminal or end portion of the container body to which the same is to be united, and while in such juxtaposed position the can end is held in place and there is caused to be passed through the contacting metals an electric current sufficient in amperage to cause the melting of the metal of the two contacting surfaces and thereby cause a welding of the metal. The welding means or rather the electrodes, by engaging the upper and lower faces of the two surfaces of metal to be united, either revolve over the surfaces of said metal or the welded or the held members are caused to rotate and the electrodes held stationary, such rotary path of either the electrodes or of the members to be welded being for the purpose of securing a progressive welding of the metal of the contacting surfaces to be united; the welding operation to all intents and purposes being a spot welding.

Inasmuch as the apparatus for the carrying out of my method invention will form or constitute the subject matter of a separate application for Letters Patent to be hereafter filed, it is not deemed necessary for an understanding of the present invention to illustrate or describe any particular form or type of an apparatus for the carrying out of the invention.

In the accompanying sheets of drawings I have illustrated diagrammatically various types of welded union of cover plates to container bodies, but it will be understood that such forms of welded unions herein illustrated constitute only a few of the many forms which may be employed and fall under my method invention.

In the drawings, Figure 1 is a side view of a can body with an end cover applied thereto, the can body being illustrated as resting upon a rotatable structure and the can end held to the body by suitable pressure means.

Figure 2 thereof discloses diagrammatically a broken sectional elevation of a container body with a flanged cover wall applied thereto and discloses the position of the electrodes for welding the contacting surfaces of the said members.

2 or 3 of the drawings, disclosing a different form of flange union.

Figure 5:
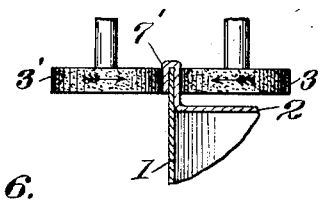

Figure 5 is a similar view illustrating a modified form of flange for the container cover plate, the flange in said case being adapted to overlie the peripheral edge of the container body.

Figure 6:
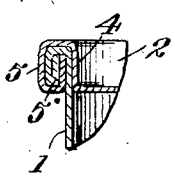
Figure 6:

Fig. 6 is a sectional detailed view illustrating an interfolding of the seam to conceal the welded edge thereof.

Figure 1:
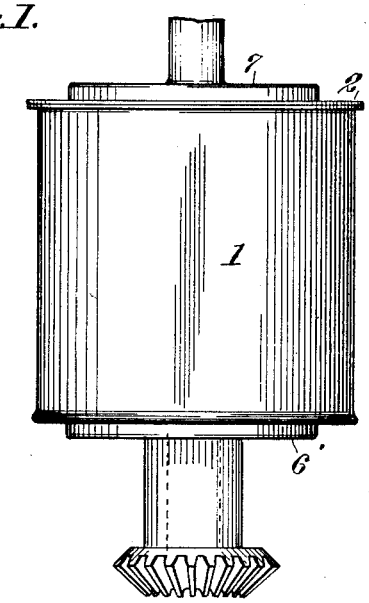
Figure 2:
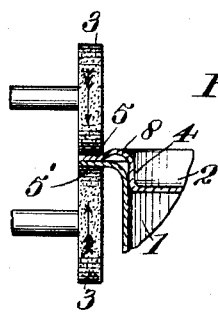
Figure 3:
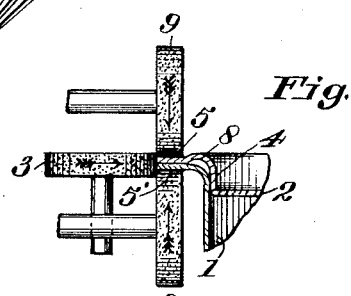
Figure 3 is a view similar to Figure 2 of the drawings illustrating roller pressure means for holding the contacting surfaces of the cover end to the flange of the container body, the welding electrode disclosed as acting on the peripheral edges of the cover flange and flange of the container body.

In the drawings, the numeral 1 is used to designate the body of a metallic container; 2 the end cover or closure wall to be applied thereto, while the numeral 3 indicates the electrodes for the spot welding of the members to be united. The end cover or closure wall 2 is shaped to conform to that of the container body to be closed and in its preferred form, as disclosed by Figs. 1 and 2 of the drawings, is provided with a cupped center and a right-angled portion forming a wall that fits snugly within the mouth of a flanged container body, the right-angled portion of the cover being designated by the reference numeral 4. The said wall 4 terminates in an outwardly extended peripheral flange 5, which is adapted to overlie and make contact with an outwardly projected circumferential flange 5' of the container body 1. When the end cover of the form disclosed by Figs. 1, 2 and 3 of the drawings is placed in superimposed relation so that the under surface of the flange 5 of the cover or closure plate 2 is in contact with the upper surface of the circumferentially disposed flange 5' of the container 1, the electrodes 3 are brought into position to bear against the upper surface of the flange 5 and the lower surface of the flange 5' and at this time the current passing through the electrodes causes a spot welding of the contacting metal and this welding is carried on progressively throughout the entire circumferential area of the said contacting members, the said electrodes, which are rotatable ones, being arranged in a vertical plane.

Figure 4:
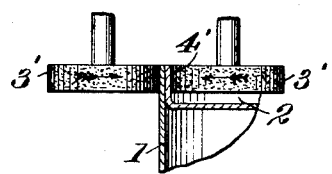
Figure 4 is a view similar to either Figs.

In Fig. 4 of the drawings the end plate or cover wall 2 is provided with an upwardly projected circumferential flange 4' and the diameter of the cover plate or wall is slightly less than the interior diameter of the container body 1 so as to fit within the open end of the container body with a tight slip joint union and the container closure wall or plate 4' is moved downwardly within the open mouth of the container body to be closed until the upper edge of its peripheral wall stands in alignment with the upper edge of the open mouth of the container body. When thus positioned the electrodes 3' are brought into engagement with the inner wall of the flange 4' and the outer periphery of the upper end of the container body and brought together to bear firmly thereon. In this case the rotating electrodes stand in a horizontal plane and when positioned as disclosed by Fig. 4 of the drawings, the current passing therebetween causes a spot welding of the contacting surfaces of the flange 4' and inner wall surface of the terminal portion of the container body 1. In this case preference is given to imparting rotary path of travel to the electrodes 3' so that the same traverses the entire circumference of the container body 1 and flange 4'. However, if so desired, the means disclosed in Fig. 1 of the drawing may be employed for imparting rotary movement to the container body instead of to the electrodes 3' and which in said view is disclosed as a rotating plate 6' and the means for holding the cover in position during the rotary movement thereof being a vertically movable chuck 7.

In Figure 5 of the drawings the end cover or closure plate 2 is illustrated as provided with a hook-shaped or reversely folded flange 7', which is adapted to hook over the terminal end portion of the end of the container to be closed. Where this form of flange is utilized the end cover or closure plate is fitted within the open mouth of the container body 1, in the same manner as disclosed by Fig. 4 of the drawings, being held in place by the hook-flange engaging with the terminal end portion of the container body 1, the electrodes 3' operating thereon in the same manner as the electrodes do in the case of the disclosure under Fig. 4 of the drawings.

The manner of uniting the end cover or closure wall 2 of the form disclosed by Figs. 4 and 5 of the drawings is more particularly designed for the spot welding of black metal or nontin-coated metal, or for use on that type of containers which are not disfigured or marred by a charring or burning of the metal.

Where the method invention is employed or utilized in continuous spot welding of a flanged can end to the flanged end of a can body, it is desirable to produce a narrowness of welding contact, in order to char as little as possible the outer surfaces of the joint. Where tin coated sheet metal cans or containers have the end cover or closure wall applied under my invention, the welded edges thereof are interfolded within a folded seam to cover up whatever unsightliness may have occurred due to the continuous spot welding, which infolding is disclosed by Fig. 6 of the drawings. The object of providing the bead or slack 8 adjacent the flange of the cover is to prevent undue stretching of the metal of the flanges 5 and 5' when the same is interfolded. The welded flanges 5 and 5' form practically an integral and immovable section. In other words, there can be no slippage between the surfaces of these flanges after welding and, as the outer fold of the interfolded seam describes a longer path than that of the inner folds without this excess metal in the bead or slack 8, it is apparent that the inner folds would either buckle or this outer fold would stretch unduly and thereby weaken the structure. It will be noted by reference to Fig. 6 of the drawings that the appearance of the finished seam or union of the can end flange to the flanged end of the can body is as to external appearances the seam which is ordinarily presented as the result of the double seaming of can ends to can-bodies, but the body flange gets an added bend in the interfolding and inasmuch as the welding together of the body flange 5' and the cover flange 5 will, if the welding is done properly, result in a hermetic seal between the body and the cover, it is not required or necessary to roll the folded seam disclosed by Fig. 6 of the drawings as tightly or as close down as has heretofore been required in the double seaming operation of uniting a flanged can end to a can body, since the interfolding is done merely to hide the charred edges of the welded joint and acts only to give a finished or sightly appearance to the welded joint.

By the use of my method invention for the uniting of end covers or plates to container bodies to be closed there is produced a stronger union between the parts united than is obtained either by the soldering method or by the double seaming method, due to the fact that as the parts are continuously spot welded, the same form and become after the welding operation a homogeneous body or structure and the same strength of union exists at the welded joint seam as exists in the metal itself, the same internal pressure of a hermetically sealed container under my method invention being required to break or rupture the seam union connection as is required to rupture or break the walls of the vessel itself.

I do not wish to be understood as restricting or confining the invention to any particular type or style of electrodes to be employed in the carrying out thereof, but on the contrary wish to be understood as claiming as broadly as the state of the art will permit, a container having its end wall or closure plate united or secured to the container body by a continuous spot welded seam and equally so, the method of so uniting the flanged cover plate or end to the container body.

Having thus described my invention, what I claim as new and desire to protect by Letters Patent of the United States, is:—

1. The method of uniting a flanged can cover to the flanged end of a can body, which comprises the forming of the flange of the can cover with a raised or curved section, superposing the flange of the cover relative to the flange of the can body, electrically welding the contiguous edges of the flanges of said members, interfolding said welded flanges and permitting the raised section or excess metal in the flange of the can cover to give with the curvature formed in the interfolding of the seam to compensate for the slippage which otherwise would occur.

2. The method of forming a can cover for attachment to a can body consisting in forming of a flange on the edge of said cover with a bead located adjacent said flange, applying said flanged cover to a flanged can body, electrically welding said flanges, and then bending said welded flanges into an interfolded seam whereby welded surfaces are completely enclosed and covered up and the said beaded portion adjacent the flange of said cover is absorbed in the formation of said interfolded seam.

3. An article of manufacture comprising a folded metal seam uniting a flanged can end and a flanged can body, said flanges being outwardly extending and superposed one on the other and united by electrical welding, and said welded flanges being bent outwardly into an interfolded seam to completely enclose and cover up the said welded surfaces.

4. An article of sheet metal manufacture comprising a flanged can end having a bead adjacent said flange, a flanged can body, said flanges being outwardly extending and superposed one over the other and united by electrical welding, and said welded flanges being thereafter bent outwardly into an interfolded seam whereby said bead is absorbed and said welded surfaces are completely enclosed and covered up.

5. An article of manufacture comprising a flanged can cover having an excess of metal adjacent said flange, and a can body having a flanged end, said flanges being superposed one on the other and forming an interfolded seam whereby said excess metal of the end flange is absorbed in the interfolding of said seam.

In testimony whereof I have signed my name to this specification.

CHARLES W. GRAHAM.